(12) United States Patent
Righetti (10) Patent No.: US 11,752,984 B2
(45) Date of Patent: Sep. 12, 2023

(54) INCLINABLE SUPPORT FOOT (71) Applicant: SIMOL S.P.A., Luzzara (IT)

(72) Inventor: Valter Righetti, San Benedetto Po (IT)

(73) Assignee: SIMOL S.P.A., Luzzara (IT)

(*) Notice: Subject to any disclaimer, the term of this patent is extended or adjusted under 35 U.S.C. 154(b) by 232 days.

(21) Appl. No.: 17/369,078

(22) Filed: Jul. 7, 2021

(65) Prior Publication Data
US 2022/0009457 A1 Jan. 13, 2022

(30) Foreign Application Priority Data
Jul. 10, 2020 (IT) .................. 102020000016843

(51) Int. Cl.
*B60S 9/12* (2006.01)
(52) U.S. Cl.
CPC ....................... *B60S 9/12* (2013.01)
(58) Field of Classification Search
CPC ............................ B60S 9/00–12; B66C 23/80
See application file for complete search history.

(56) References Cited

FOREIGN PATENT DOCUMENTS

| DE | 965472 C | 6/1957 | |
|---|---|---|---|
| DE | 3002735 A1 | 8/1980 | |
| DE | 20104087 U1 | 5/2001 | |
| DE | 102010020452 A1 * | 11/2011 | ............... B60S 9/12 |
| DE | 202012005856 U1 * | 9/2012 | ............... B60S 9/12 |
| EP | 0945318 A1 | 9/1999 | |

* cited by examiner

Primary Examiner — Tyrone V Hall, Jr.
(74) Attorney, Agent, or Firm — Browdy and Neimark, PLLC (57) ABSTRACT

A support foot (100) comprising: a first body (105), a second body (110) slidingly coupled to the first body (105) along a predetermined sliding direction (A), an actuator device (150) adapted to actuate the second body (110) to slide with respect to the first body (105) along said sliding direction (A) between a retracted position and an advanced position, a third body (115) hinged to the first body (105) according to a hinging axis (B) orthogonal to the sliding direction (A) of the second body (110), and an actuation apparatus adapted to actuate the first body (105) to rotate with respect to the third body (115) around said hinging axis (B) between an active configuration and an inactive configuration, wherein said actuation apparatus comprises a mechanism adapted to transform a sliding of the second body (110) from the advanced position towards the retracted position into a corresponding rotation of the first body (105) from the active configuration to the inactive configuration.

17 Claims, 11 Drawing Sheets

INCLINABLE SUPPORT FOOT

TECHNICAL FIELD

The present invention relates to a support foot adapted to be used for supporting and the stabilization on the ground of mobile structures, such as for example trailers, trolleys, construction machines, agricultural machines, industrial vehicles or any other type of vehicle.

STATE OF THE ART

It is known that a support foot is generally configured as a telescopic column which comprises a first body adapted to be stably fixed to the structure to be supported, and a second body slidingly coupled to the first body and movable with respect to the latter between a retracted position, in which the second body is raised from the ground, and an advanced position, in which the second body is pushed into contact with the ground, keeping the structure to be supported raised.

The actuation of the second body with respect to the first body can be performed manually or automatically, through mechanical, hydraulic or any other type of device.

A drawback linked to said rest feet consists in the fact that, even when the second body is in retracted position, the vertical overall dimension of the support foot, which is mainly due to the height of the first body, is still quite significant.

In order to face this drawback, rest feet in which the first body is fixed to the structure to be supported by a third body, which is hinged to the first body according to a substantially horizontal hinging axis, have been proposed.

In this way, when the support foot is not used, the telescopic column formed by the first and second bodies can be rotated by an active configuration, in which said column is oriented substantially vertically, towards an inactive configuration, in which said column is oriented substantially horizontally, significantly reducing the vertical overall dimension of the support foot.

The displacement of the telescopic column from the active configuration to the inactive configuration can be carried out manually or more preferably in an automated way.

However, the currently available automated solutions always provide for the adoption of a further actuator device, which is added to the actuator device used for sliding the second body with respect to the first body, complicating the support foot and making it overall rather expensive.

DISCLOSURE OF THE INVENTION

In the light of the foregoing, an object of the present invention is to solve or at least to mitigate the aforementioned drawbacks of the prior art, in the context of a simple, rational and relatively low cost solution.

These and other objects are reached thanks to the characteristics of the invention as set forth in the independent claim 1. The dependent claims outline preferred and/or particularly advantageous aspects of the invention but not strictly necessary for its attainment.

In particular, an embodiment of the present invention makes available a support foot comprising:
a first body.
a second body slidingly coupled to the first body along a predetermined sliding direction,
an actuator device adapted to actuate the second body to slide with respect to the first body along said sliding direction between a retracted position and an advanced position,
a third body hinged to the first body according to a hinging axis orthogonal to the sliding direction of the second body, and
an actuation apparatus adapted to actuate the first body to rotate with respect to the third body around said hinging axis between an active configuration and an inactive configuration,
wherein said actuation apparatus comprises a mechanism (or kinematic mechanism) adapted to transform a sliding of the second body from the advanced position towards the retracted position into a corresponding rotation of the first body from the active configuration to the inactive configuration.

Thanks to this solution, the support foot can be advantageously installed on the structure to be supported so that, when in the active configuration, the first body is arranged substantially vertically, allowing the second body to be lowered towards the ground so as to raise and support the structure.

On the other hand, when the support foot is not in use, for example after the second body has been raised from the ground, it will be advantageously possible to bring the first body (and therefore also the second body) into an inactive configuration, inclining it with respect to the vertical and thus reducing the overall vertical dimension of the support foot.

On the other hand, thanks to the mechanism that transforms the sliding of the second body into the rotation of the first body, this variation of inclination is advantageously obtained by using a single actuator device, i.e. Then one that also takes care of the sliding of the second body, simplifying the support foot and making it cheaper overall.

According to an aspect of the invention, said actuator device can comprise at least one hydraulic jack.

This solution allows to move the second body in a precise and uniform way and to be able to apply the necessary forces to activate the mechanism that produces the rotation of the first body.

However, it is not excluded that, in other embodiments, the actuator device may be of the electromechanical type, for example that it may comprise a screw/nut screw system driven by an electric motor.

According to another aspect of the invention, the mechanism that brings about the rotation of the first body can comprise at least a thrust portion of the second body which, at least in a terminal section of the displacement of the second body from the advanced position to the retracted position, is adapted to stay in contact with a corresponding abutment portion of the third body, in a point (or area) which is misaligned with respect to the hinging axis along the sliding direction.

Thanks to this solution, the axial thrust between the thrust portion and the abutment portion generates a moment of force around the hinging axis which advantageously allows to obtain a mutual rotation between the third body and the first body.

Another aspect of the invention provides that the actuation apparatus adapted to rotate the first body can comprise a contrast spring adapted to counteract the rotation of the first body from the active configuration to the inactive configuration. This contrast spring has the effect of promoting the automatic return of the first body to the active configuration.

In particular, this contrast spring has the advantage of ensuring that the first body can reach the active configuration, for example a perfectly vertical orientation, even if, by virtue of the relative position of the hinging axis and the centre of mass, the effect of gravity would be in such a way as to bring and maintain the first body in a configuration different from the active one, for example in an inclined orientation.

By way of example, the contrast spring can be a helical bending spring at least partially wound around the hinging axis.

In this way the contrast spring is able to exert a sufficiently high force despite particularly small overall dimensions.

According to another aspect of the invention, the support foot can comprise a second contrast spring, which is adapted to counteract the rotation of the first body from the active configuration in the opposite direction with respect to the inactive configuration.

The effect of this second contrast spring is to prevent the thrust generated by the first contrast spring from pushing the first body to overcome the active configuration.

In practice, the combined action of the first and second contrast springs ensures that the first body reaches and is stably maintained in active configuration.

According to another aspect of the invention, the first body can be hinged to the third body through a joint configured so that, when the first body is in the active configuration, the joint allows a mutual displacement between the first body and the third body in a direction that is parallel to the sliding direction of the second body, between an unlocked position, in which the first body is free to rotate with respect to the third body around the hinging axis, and a locked position, in which the first body is unable to rotate with respect to the third body.

Thanks to this solution it is advantageously possible to guarantee that, when the support foot is in use for supporting a structure, unwanted and/or accidental rotations of the first body (and therewith of the second body) cannot occur, for example following external shocks or stresses, which otherwise could affect the stability and safety of the system.

Another aspect of the invention provides that the support foot can comprise a centering hole, obtained in one between the first body and the third body, which has a central axis spaced from the hinging axis and parallel to the sliding direction, at least when the first body is in active configuration, and a pin, stably fixed to the other between the first body and the third body, which is adapted to fit coaxially into the centering hole, following a displacement of the first body from the unlocked position to the locked position.

In this way, the coupling between the pin and the corresponding centering hole helps to correctly position the first body with respect to the third body and to prevent the first body from rotating around the hinging axis when it is in locked position.

Going into more detail, an aspect of the invention provides that the first body can have a tubular shape and is provided with a first axial end and an opposite second axial end, the second body having an elongated shape provided in turn with a first axial end and an opposite second axial end, the second body being slidably fitted into the first body so that the first axial end of the second body protrudes from the first axial end of the first body at least when the second body is in advanced position.

Thanks to this solution, the first and second bodies globally create a telescopic column which has the advantage of being particularly compact, stable and safe.

The third body can be hinged to the first body near the second axial end of the first body itself.

In this way, it is easier to install the support foot on the structures to be supported and can be reclined more efficiently.

The thrust portion of the second body can be defined by the second axial end of the second body itself, which can optionally be shaped accordingly.

Thanks to this solution it is advantageously possible to rotate the first body with respect to the third body with no need to increase the number of components of the support foot, remaining within the scope of a simple, compact and relatively inexpensive solution.

The abutment portion of the third body can be defined by at least a protruding element which, when the first body is in the active configuration, is fitted inside the second axial end of the first body itself.

In this way it is advantageously possible to increase the angular travel that the first body can perform by passing from the active configuration to the inactive configuration.

According to another aspect of the invention, the joint through which the third body is hinged to the first body can comprise at least one support provided with a cylindrical hole having axis coinciding with the hinging axis, and at least one pin having at least one engagement portion axially inserted inside said cylindrical hole, said support and said pin being fixed respectively to one and the other between the third body and the first body.

This aspect provides a particularly simple and reliable solution for realising the rotation joint between the first and third bodies.

In particular, an aspect of the invention provides that said support can be further provided with a slot communicating with the cylindrical hole and extending with respect to the latter along a longitudinal direction which is parallel to the sliding direction of the second body, at least when the first body is in the active configuration, said slot having a width, in a direction orthogonal to said longitudinal direction and to the hinging axis, smaller than the diameter of the cylindrical hole, said engagement portion of the pin having a lateral surface provided with a cylindrical portion with a radius substantially equal to the radius of the cylindrical hole and at least one flattening, the size of the engagement portion along a direction orthogonal to said flattening and passing through the centre of the cylindrical portion being substantially equal to the width of the slot, the pin and the support being mutually oriented so that, when the first body is in the active configuration, the engagement portion of the pin can slide inside the slot along the sliding direction.

This aspect of the invention provides a rather simple and reliable solution for realising a joint which, in addition to allowing the rotation of the first body with respect to the third body, is also able to allow the displacements of the first body from the unlocked position to the locked position, as explained above.

Another aspect of the invention provides that the third body can comprise a flat surface which, when the first body is in the active configuration, is facing the second axial end of the first body and can be oriented orthogonally with respect to the sliding direction.

In this way, when the first body is in the active configuration, the third body is substantially aligned with the first body and with the second body along the sliding direction, increasing the stability of the support foot.

The support foot can further comprise a buffer plate which is fixed to the second axial end of the first body and is adapted to face the flat surface of the third body, when the first body is in the active configuration.

This buffer plate has the advantage of at least partially closing the second axial end of the first body, increasing the safety of the support foot.

In this context, the aforementioned second contrast spring can be a compression spring fixed to the buffer plate or to the flat surface of the third body.

In this way, when the first body is in the active configuration, the second contrast spring is interposed between the buffer plate and the flat surface of the third body, where it can perform its function in a particularly effective way.

BRIEF DESCRIPTION OF THE FIGURES

Further features and advantages of the invention will be more apparent after reading the following description provided by way of non-limiting example, with the aid of the figures shown in the accompanying drawings.

DETAILED DESCRIPTION

From the aforementioned figures, a support foot 100 of the type suitable for being installed on a movable structure, in order to allow a stable and safe support on the ground can be seen.

The movable structure can be, for example, a trailer, a construction machine, an agricultural machine, an industrial vehicle, a transport trolley or any other type of vehicle.

Figure 1:
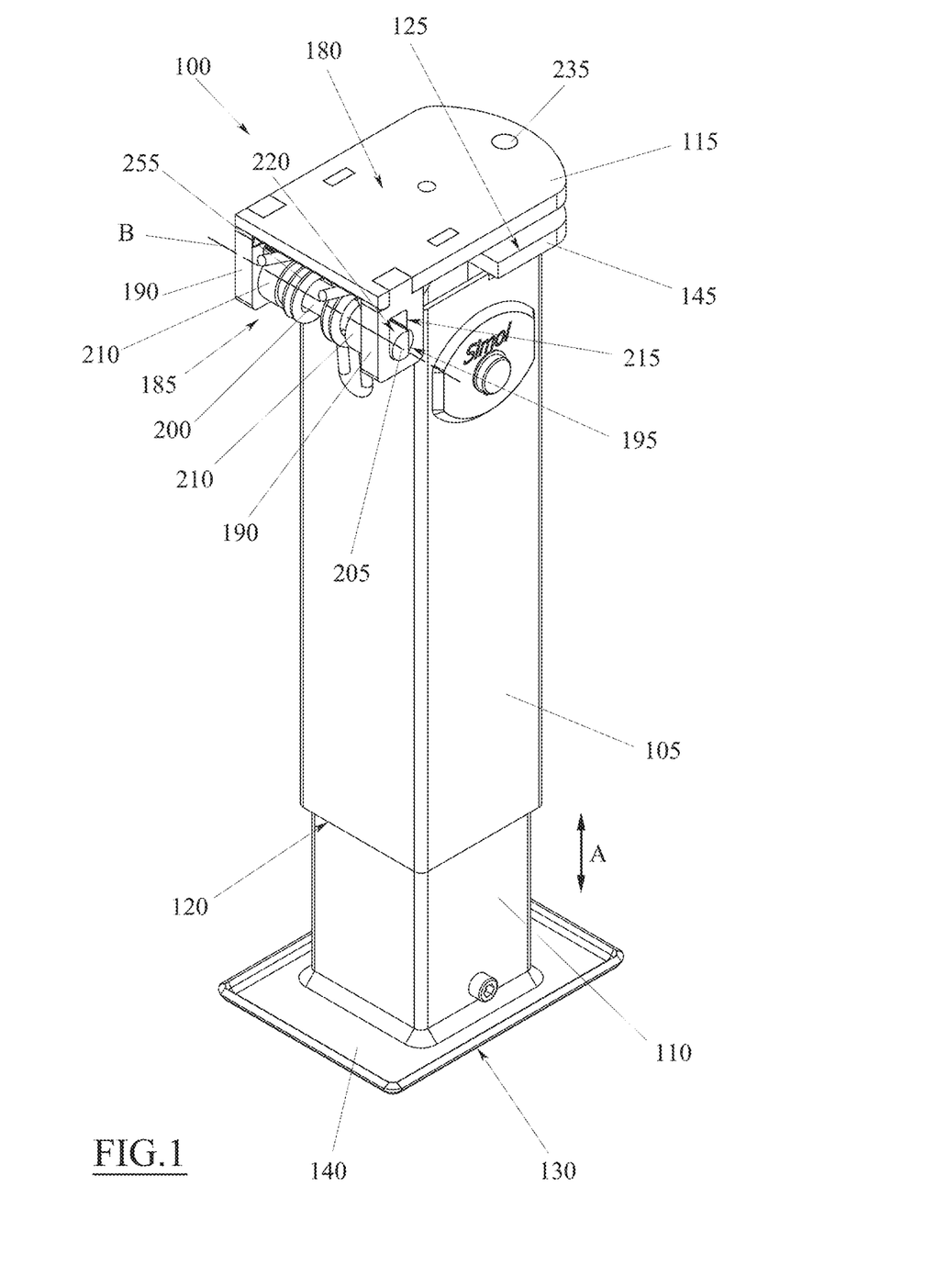
FIG. 1 is an axonometric view of a support foot according to an embodiment of the present invention.
Figure 2:
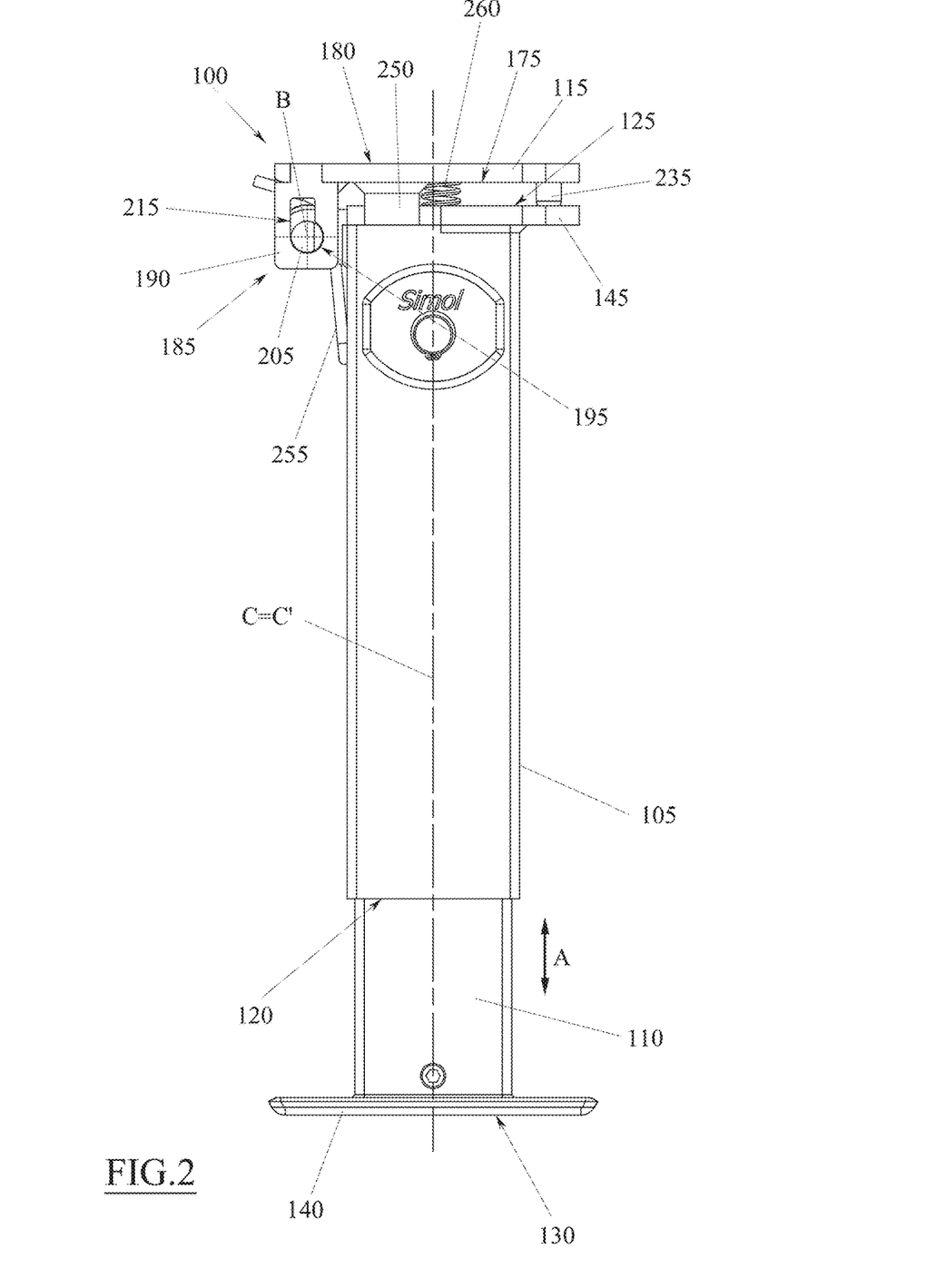
FIG. 2 is a lateral view of the support foot of FIG. 1.

As illustrated in FIG. 1, the support foot 100 comprises at least three distinct and mutually coupled bodies, of which a first body 105, a second body 110 and a third body 115.

The second body 110 is slidingly coupled to the first body 105 so as to be able to slide with respect to the latter along a predetermined sliding direction A.

The first body 105 is hinged to the third body 115 so as to be able to rotate with respect to the latter around a hinging axis B orthogonal to the sliding direction A.

The first body 105 can have an elongated shape, for example tubular, which extends longitudinally along a predetermined central axis C, parallel to the sliding direction A, between a first axial end 120 and a second and opposite axial end 125.

In the illustrated example, the cross section of the first body 105 is substantially rectangular/square but it is not excluded that, in other embodiments, the same may be circular or of any other shape.

Figure 6:
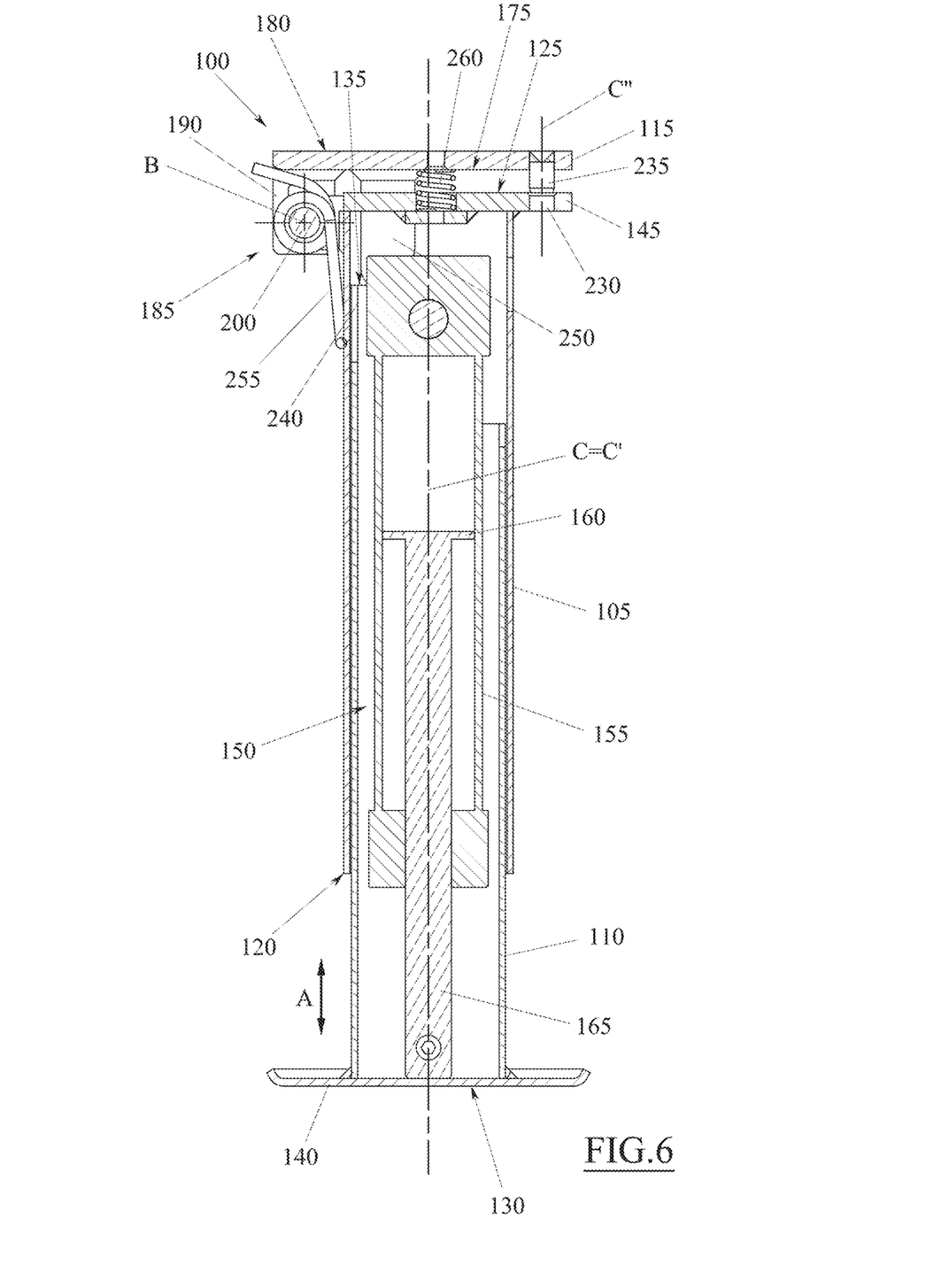
FIG. 6 is the section VI-VI indicated in FIG. 3.

The second body 110 can also have an elongated shape, for example tubular, which extends longitudinally along a predetermined central axis C', parallel to the sliding direction A, between a first axial end 130 and a second and opposite axial end 135 (see for example FIG. 6).

The second body 110 can be axially inserted inside the first body 105, so that the central axis C' of the second body 110 is parallel to or coinciding with the central axis C of the first body 105.

For example, the cross section of the second body 110 can have a shape conjugated to the one of the first body 105 and external dimensions substantially equal to the internal dimensions of the latter, so as to be substantially housed at length within the first body 105 and avoid mutual displacements in transverse direction.

In this way, the second body 110 can slide telescopically with respect to the first body 105 along the sliding direction A which is parallel to the central axes C and C'.

In particular, the second body 110 can slide with respect to the first body 105 between an advanced position (illustrated in FIG. 7) and a retracted position (illustrated in FIG. 8) and vice versa.

Figure 7:
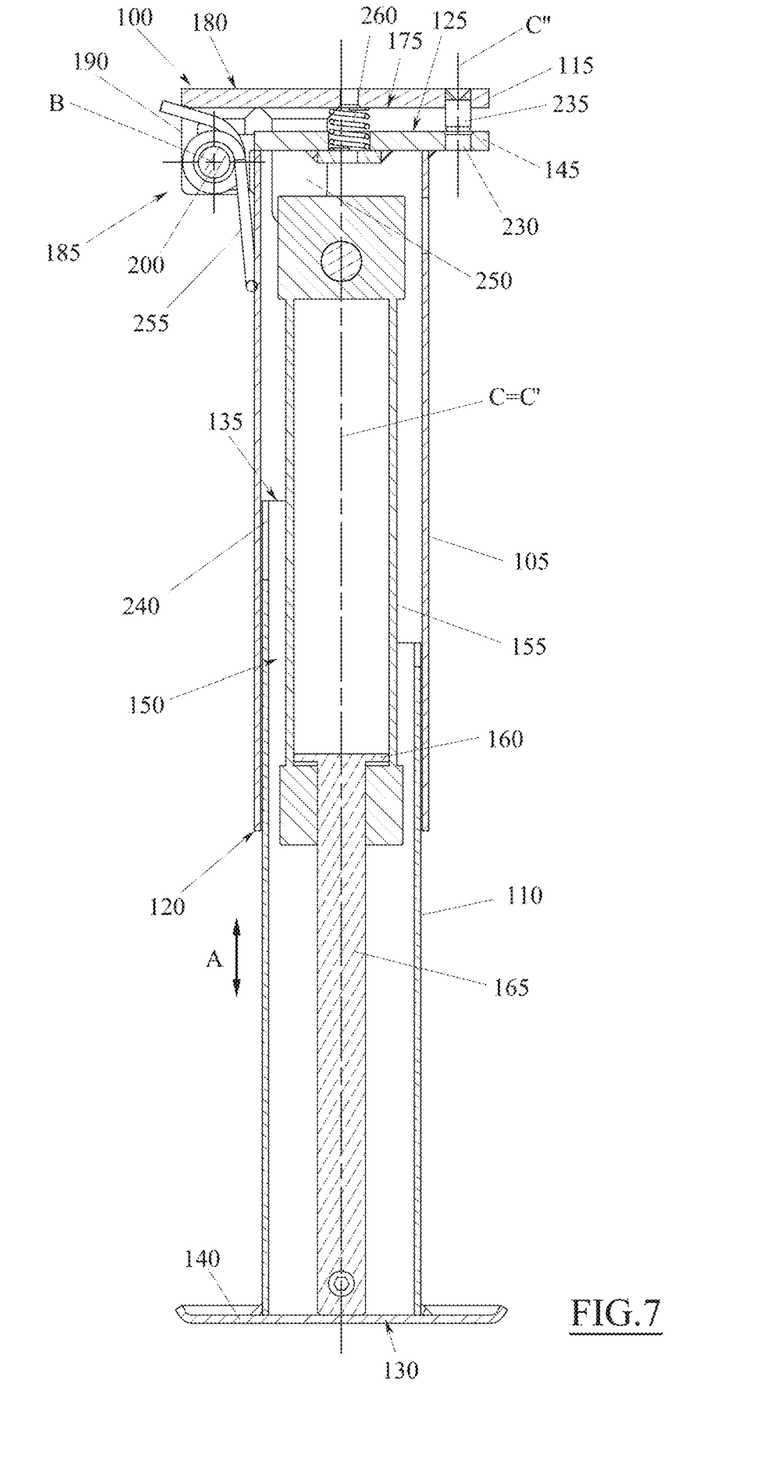
FIG. 7 is the section of FIG. 6 shown with the second portion of the support foot in advanced position.

When it is in advanced position, the first axial end 130 of the second body 110 protrudes from the first axial end 120 of the first body 105, while the second axial end 135 preferably remains contained inside the first body 105.

Moving towards the retracted position (see for example FIG. 6), the distance between the second axial end 135 of the second body 110 and the first axial end 120 of the first body 105 increases progressively, thus reducing the protruding portion of the second body 110.

Upon reaching the retracted position, the first axial end 130 of the second body 110 can still protrude at least slightly from the first axial end 120 of the first body 105, while the second axial end 135 of the second body 110 can protrude on the opposite side, i.e. from the second end axial 125 of the first body 105, for the reasons which will become evident below.

A platform 140 intended to be placed on the ground or any other reference surface can be fixed (e.g. welded) to the first axial end 130 of the second body 110.

In other embodiments, the platform 140 could however be replaced by any other contact element, for example by a wheel.

On the opposite side, the second axial end 125 of the first body 105 can be at least partially closed by a buffer plate 145, which can be oriented substantially orthogonal to the central axis C and can be stably fixed (for example welded) to the second axial end 125 of the first body 105.

The sliding of the second body 110 between the advanced and retracted positions (and vice versa) is obtained through an actuator device 150.

In the illustrated example, the actuator device 150 can comprise a hydraulic jack, preferably double acting, which has a portion fixed to the first body 105, and a second portion, sliding with respect to the first portion, which is fixed to the second body 110.

For example, the hydraulic jack can comprise a cylinder 155, the internal volume of which is divided into two distinct chambers by a piston 160 to which a stem 165 which protrudes externally through one of the two axial ends of the cylinder is fixed.

The cylinder 155 can be fixed to the first body 105 while the protruding portion of the stem 165 can be fixed to the second body 110 (or vice versa).

In this way, by supplying pressurized oil in one or the other internal chamber of the cylinder 155, it is possible to cause the stem 165 to slide and therefore the lengthening or shortening of the hydraulic jack and consequently the sliding of the second body 110.

In the illustrated example, the first body 105 and the second body 110 both have a tubular shape and the hydraulic jack can be advantageously placed inside them.

In particular, the cylinder 155 can be fixed inside the first body 105, for example near the second axial end 125, while the protruding section of the stem 165 can be fixed inside the second body 110, for example near the first axial end 130.

The fixing can be obtained by means of a pair of pins, or any other hinge connection system, suitable for defining hinging axes mutually parallel and orthogonal to the central axes C and C' of the first and second bodies 105 and 110.

To allow the operation of the hydraulic jack, the cylinder 155 can be connected to a hydraulic supply circuit (not shown since it is conventional per se) which comprises a pump adapted to take oil from a tank and a hydraulic valve (or distributor) adapted to receive oil from the pump and supply it, under command, selectively in one or the other internal chamber of the cylinder 155.

Figure 3:
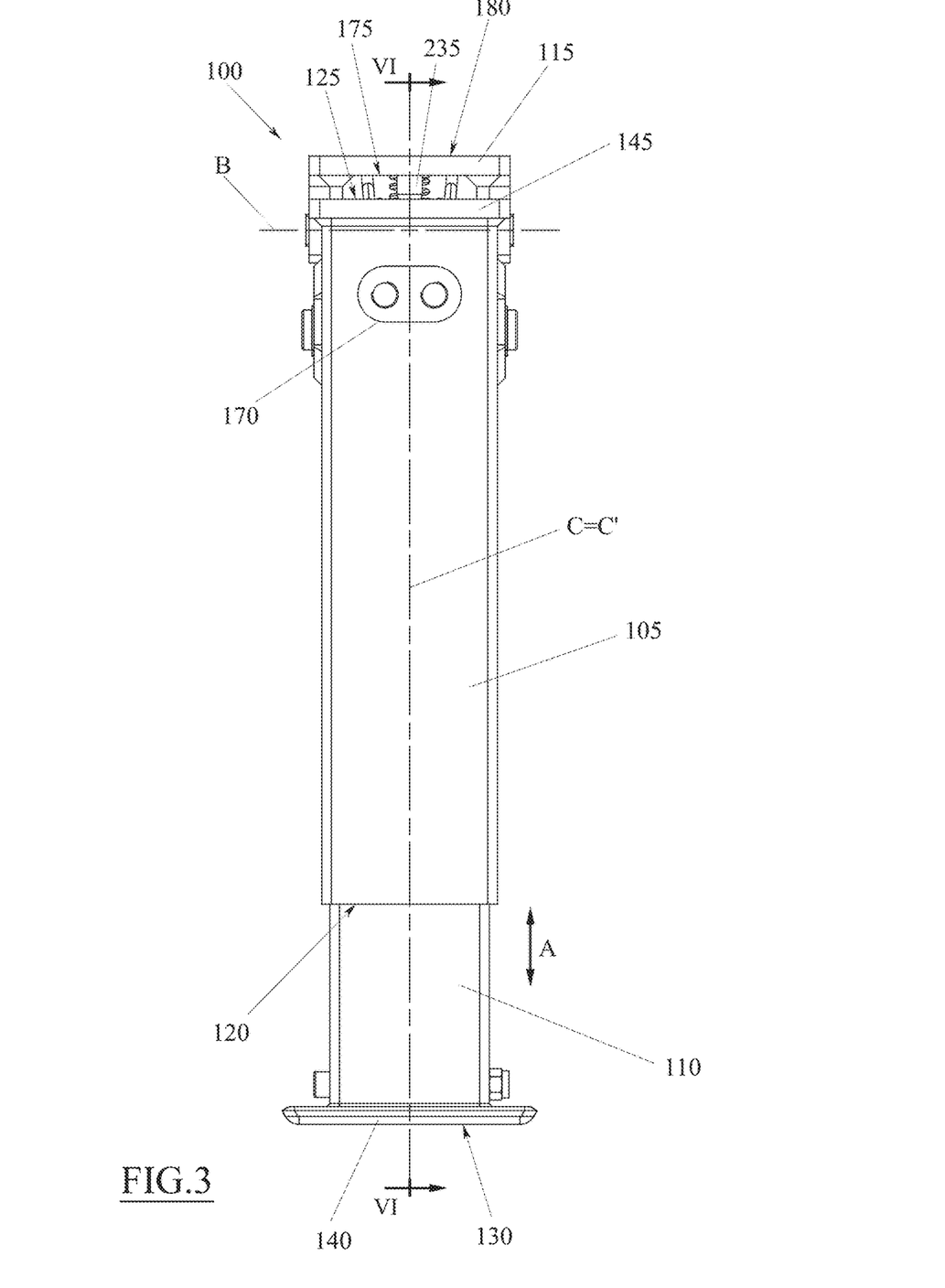
FIG. 3 is a front view of the support foot of FIG. 1.

The connection between the cylinder 155 and the hydraulic circuit can be obtained through ducts (not shown) which can be made to pass inside the first body 105 through an access opening 170 obtained in its front side (see FIG. 3).

However, it is not excluded that, in other embodiments, the hydraulic jack may be replaced by another type of actuator device, for example by a mechanical screw/nut type system, possibly driven in a motorized way.

Moving on to the third body 115, the same can be hinged at the second axial end 125 of the first body 105, or in such a way that the hinging axis B is closer to the second axial end 125 than to the first axial end 120.

The hinging axis B is orthogonal to the central axis C of the first body 105 and preferably spaced from the latter.

For example, the hinging axis B can be positioned outside the cross section of the first body 105.

Figure 8:
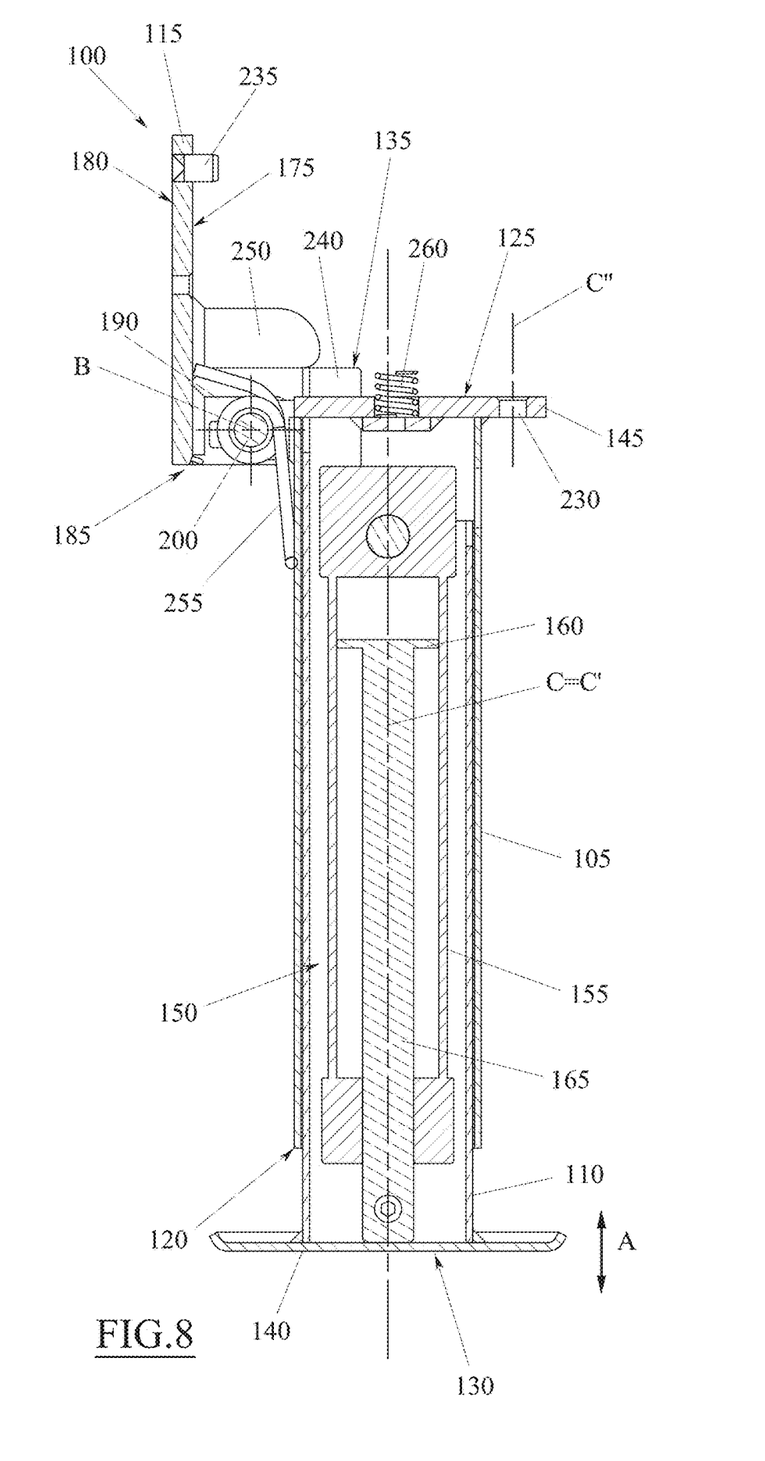
FIG. 8 is the section of FIG. 6 shown with the second portion of the support foot in retracted position.

By rotating around the hinging axis B, the first body 105, and therewith the second body 110, can be displaced with respect to the third body 115 between an active configuration (illustrated in FIGS. 6 and 7) and an inactive configuration (illustrated in FIG. 8).

When the first body 105 is in the active configuration, the third body 115 is substantially facing the second axial end 125 of the first body 105 along the direction of the central axis C.

When the first body 105 is in the inactive configuration, the third body 115 can instead be arranged substantially alongside the first body 105.

For example, the third body 115 can comprise a flat surface 175 which, when the first body 105 is in the active configuration, is facing the second axial end 125 of the same, for example substantially perpendicular to the central axis C and parallel to the possible puffer plate 145.

When, instead, the first body 105 is in the inactive configuration, the flat surface 175 of the third body 115 can be parallel (or at least inclined) with respect to the central axis C, that is perpendicular (or at least inclined) with respect to the eventual buffer plate 145.

In particular, the third body 115 can be shaped like a plate provided with the aforesaid flat surface 175 and with a further flat surface 180, parallel and opposed to the first one, which is adapted to be stably fixed to the structure to be supported (see FIGS. 13-18).

As illustrated in FIG. 1, the hinging between the first body 105 and the third body 115 can be obtained through a suitable joint 185.

This joint 185 comprises at least one support 190 or, more preferably, a pair of mutually opposed supports 190, each of which is provided with a cylindrical hole 195 having a central axis coinciding with the hinging axis B.

Each support 190 can for example be shaped like a plate and the cylindrical hole 195 can be defined by a through hole obtained in said plate.

The joint 185 can further comprise at least a pin 200 having an axis coinciding with the hinging axis B, which has, for each support 190, an engagement portion 205 coaxially fitted in the corresponding cylindrical hole 195.

In the illustrated example, each support 190 is stably fixed (for example welded) to the third body 115, while the pin 200 is stably fixed to the first body 105.

For example, the pin 200 can be carried by one or more brackets 210 which are stably fixed (for example welded) on the external lateral surface of the first body 105, at/near the second axial end 125 of the same.

However, it is not excluded that, in other embodiments, the pin 200 can be stably fixed to the third body 115 and that each support 190 can be stably fixed to the first body 105.

Figure 4:
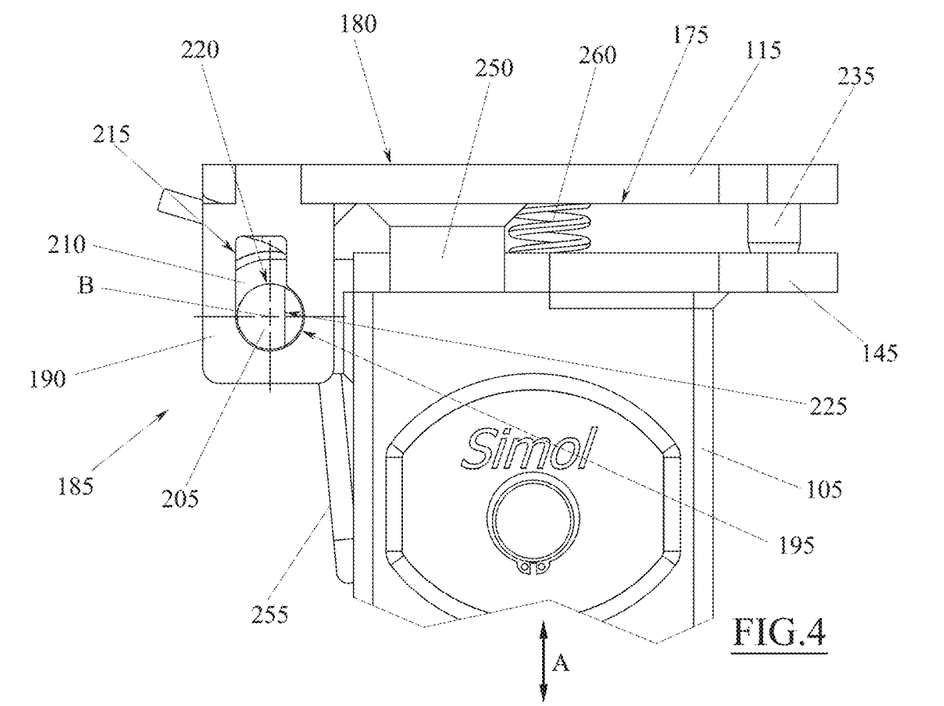
FIG. 4 is an enlarged portion of FIG. 2 in which the support foot is in unlocked position.
Figure 5:
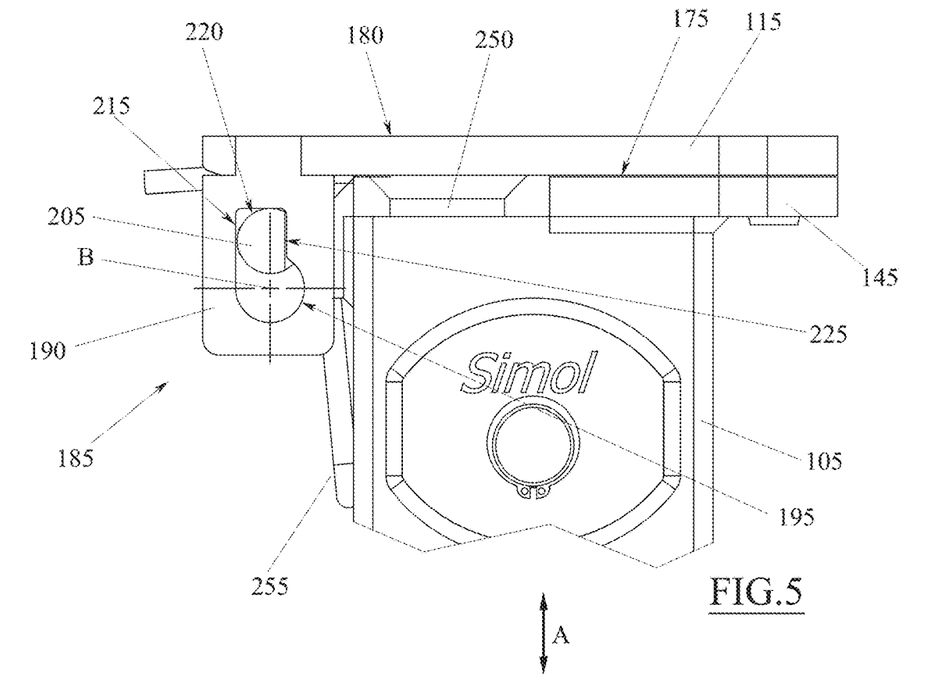
FIG. 5 is the view of FIG. 4 shown with the support foot in locked position.

Preferably, the joint 185 is further configured in such a way that when the first body 105 is in active configuration, a mutual displacement between the first body 105 and the third body 115 is allowed in a direction parallel to the sliding direction A of the second body 110, between an unlocked position (illustrated for example in FIG. 4) and a locked position (illustrated for example in FIG. 5).

In the unlocked position, the first body 105 is free to rotate around the hinging axis B from the active configuration to the inactive configuration and vice versa.

In the locked position, the first body 105 is instead locked to the third body 115 and unable to rotate around the hinging axis B.

To allow this further degree of freedom, each support 190 can be provided with a slot 215 which is derived (i.e. which is in communication) with the cylindrical hole 195.

This slot 215 has three characteristic dimensions, including a depth in a direction parallel to the hinging axis B, a length in a predetermined longitudinal direction orthogonal to the hinging axis B, and a width in a direction orthogonal both to the hinging B and to the longitudinal direction.

The depth of the slot 215 can be substantially equal to the depth of the cylindrical hole 195.

In this case, the slot 215 can also be of the type passing through the thickness of the relative support 190.

The length of the slot 215 is chosen in such a way that it projects laterally from the respective cylindrical hole 195 (with which it is in communication), creating a sort of extension.

The longitudinal direction defining the length of the slot 215 is parallel to the sliding direction A of the second body 110, at least when the first body 105 is in the active configuration.

Finally, the width of the slot 215 is smaller than the diameter of the respective cylindrical hole 195 and preferably greater than the radius.

For example, one of the two flanks of the slot 215 which are mutually opposed along the direction of the width can be tangent to the cylindrical hole 195, while the other flank can intersect the cylindrical hole 195 at an intermediate point, forming therewith globally an opening having essentially the shape of a bevelled L.

Correspondingly, the engagement portion 205 of the pin 200, which is fitted into the cylindrical hole 195, can have a lateral surface provided with a cylindrical portion 220 and at least a flat portion or a flattening 225.

The radius of the cylindrical portion 220 can be substantially equal to the radius of the cylindrical hole 195, while the size of the engagement portion 205, measured perpendicular to the flattening 225 and passing through the centre of the cylindrical portion 220, can be substantially equal or slightly smaller than the width of the slot 215.

In this way, there is at least one relative angular position between the engagement portion 205 and the corresponding support 190 such that the projection of the lateral surface of the engagement portion 205, made with respect to the longitudinal direction of the slot 215, is completely contained inside the width of the slot 215 itself.

In other words, there is at least one relative angular position between the engagement portion 205 and the corresponding support 190 such that the overall dimension of the engagement portion 205 is completely contained in the overall dimension of the slot 215 and can therefore slide longitudinally inside it.

In this angular position, which is reached when the first body 105 is in the active configuration, the first body 105 can therefore move with respect to the third body 115, making a given displacement in a direction parallel to the sliding direction A, from the previously mentioned unlocked position to the locked position and vice versa.

In all the other angular positions, the overall dimension of the engagement portion 205 are instead greater than the width of the slot 215, so that the first body 105 can only rotate with respect to the third body 115.

When the first body 105 is in the unlocked position (see FIG. 4), the axis of the cylindrical surface 220 of the engagement portion 205 coincides with the axis of the corresponding cylindrical hole 195, allowing the first body 105 to rotate around the hinging axis B.

When the first body 105 is in the locked position (see FIG. 5), the flat surface 225 of the engagement portion 205, being fitted into the slot 215, creates a prismatic coupling with the latter which prevents the rotation of the first body 105, locking it in the active configuration.

To lock the first body 105 more stably to the third body 115, the support foot can further comprise a centering hole 230 (see for example FIG. 6) having a central axis C'' that is spaced (i.e. not incident) with respect to the hinging axis B and parallel to the sliding direction A, at least when the first body 105 is in active configuration, and a corresponding pin 235 adapted to be coaxially inserted inside said centering hole 230, during the displacement of the first body from the unlocked position to the locked position.

In particular, the centering hole 230 can be obtained in the first body 115, for example extending through the buffer plate 145, while the pin 235 can be stably fixed to the third body 115, for example protruding in a cantilever manner from the flat surface 175.

However, it is not excluded that, in other embodiments, the centering hole 230 and the corresponding pin 235 can be inverted, i.e. that the centering hole 230 can be obtained in the third body 115 and that the pin 235 can be fixed to the first body 115, for example to the buffer plate 145.

In any case, to increase the stability of the system, it is preferable that the central axis C'' of the centering hole 230, and consequently also of the pin 235, is as far as possible from the hinging axis B and possibly lying in a plane orthogonal to said hinging axis B and equidistant from the supports 190 of the joint 185.

Of course, when the first body 105 is in unlocked position, the pin 235 is completely removed from the centering hole 230, so as to allow its rotation between the active configuration and the inactive configuration and vice versa.

The support foot 100 further comprises an actuation apparatus adapted to actuate the first body 105 to rotate with respect to the third body 115 about the hinging axis B.

This actuation apparatus can comprise a mechanism (or kinematic mechanism), which is configured to transform a sliding of the second body 110 from the advanced position towards the retracted position into a corresponding rotation of the first body 105 from the active configuration to the inactive configuration.

In this way, with only the actuator device 150, for example with only the hydraulic jack, it is advantageously possible to obtain both movements, i.e. it is possible to both slide the second body 110 with respect to the first body 105 and rotate the latter with respect to the third body 115.

The aforesaid mechanism can comprise one or more thrust portions of the second body 110 which, at least in a terminal section of the displacement from the advanced position to the retracted position, are individually adapted to stay in contact with a corresponding abutment portion of the third body 115, exercising on it a pressure directed parallel to the sliding direction A but offset (that is spaced) with respect to the hinging axis B.

Figures 9, 10:
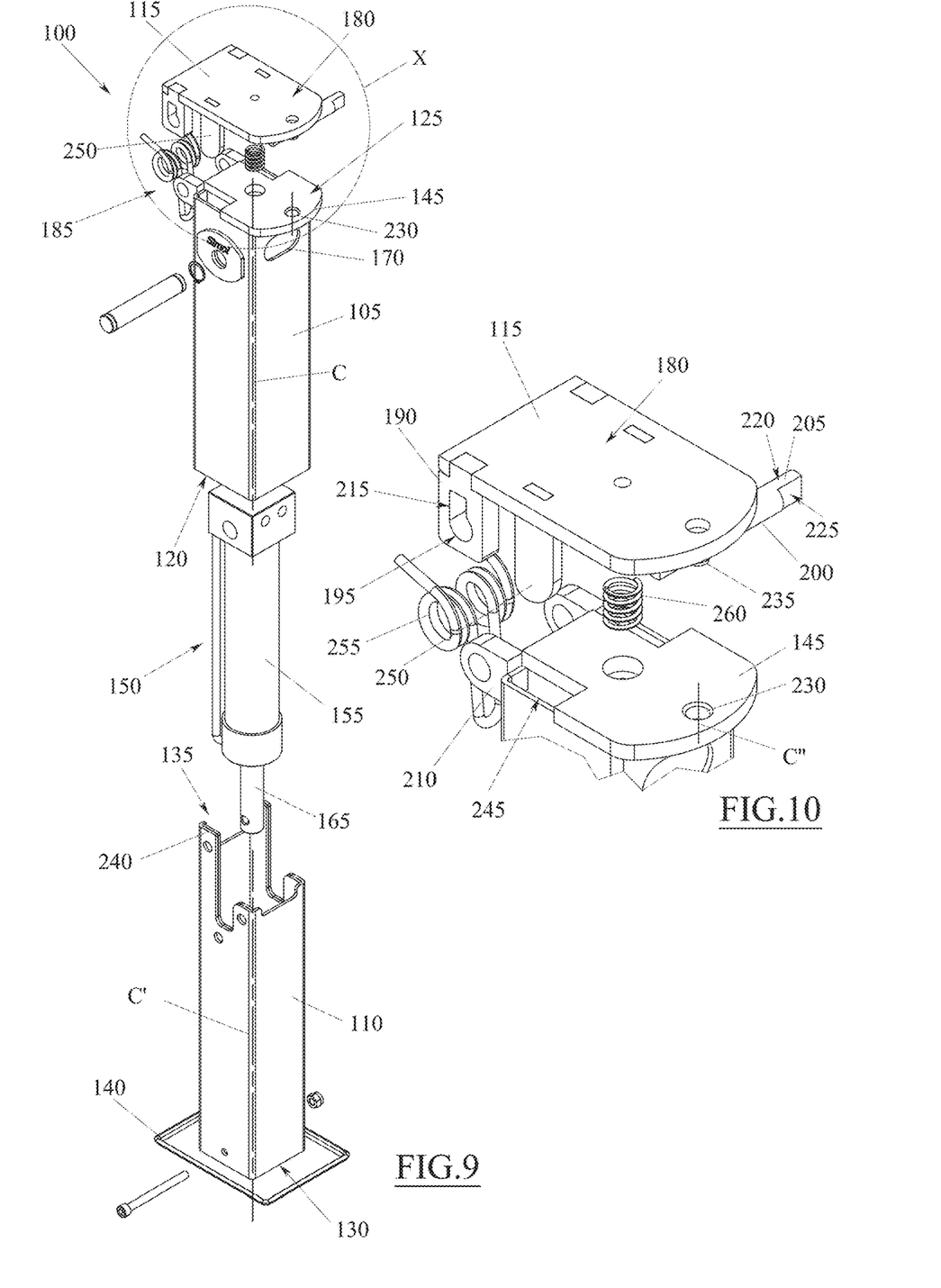
FIG. 9 is an exploded axonometic view of the support foot of FIG. 1.
FIG. 10 is the detail X of FIG. 9 shown on an enlarged scale.
Figures 11, 12:
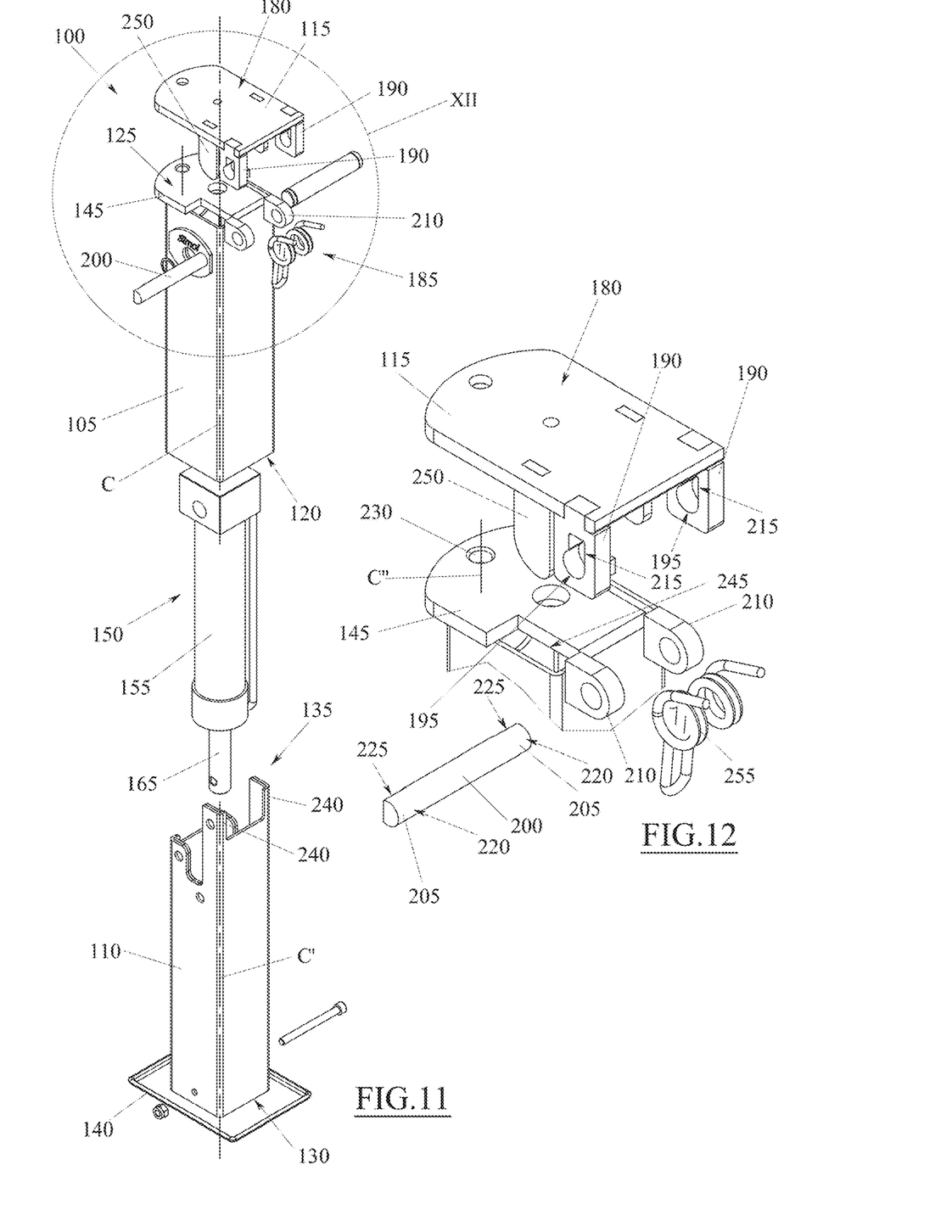
FIG. 11 is an axonometic exploded view of the support foot of FIG. 1 from a different angle.
FIG. 12 is the detail XII of FIG. 11 shown on an enlarged scale.

As visible in the exploded views of FIGS. 9 and 11, these thrust portions can for example be defined by the second axial end 135 of the second body 110.

In particular, the second axial end 135 can be shaped so as to have two protrusions 240, which can be mutually opposed along a direction parallel to the hinging axis B, and whose extremity edges can represent the points of the second body 110 placed at the maximum distance from the first axial end 130.

The distance between the extremity edges of the protrusions 240 and the first axial end 130 can be greater than the distance separating the first axial end 120 from the second axial end 125 of the first body 105, so that, during the sliding of the second body 110 towards the retracted position, the protrusions 240 may progressively protrude beyond the second axial end 125 of the first body 105, for example by passing through corresponding openings 245 left open by the buffer plate 145.

The second axial end 135 of the second body 110 can then feature further shapes, for example slots and/or lightenings, to ensure that, during this displacement, there is no interference with other components of the support foot 100, for example with the eventual hydraulic jack and with the pins with which the latter can be fixed to the first body 105.

Correspondingly, each abutment portion of the third body 115 can be defined by a protruding element 250 which protrudes in a cantilever manner from the flat surface 175.

Each of these protruding elements 250 can consist of a plate which is stably fixed (e.g. welded) to the third body 115 and which can have a rounded extremity edge.

When the first body 105 is in active configuration (see FIG. 7), each protruding element 250 can be fitted inside the second axial end 125 of the first body 105 itself, for example through the already mentioned openings 245, thus being aligned with a respective protrusion 240 of the second body 110 along a direction parallel to the sliding direction A but offset (i.e. spaced) with respect to the hinging axis B.

In this way, while the second body 110 slides towards the retracted position (see FIG. 6), each thrust portion of the second body 110, in this case each protrusion 240, comes into contact with the corresponding abutment portion of the third body 115, in this case with the corresponding protruding element 250, before the second body 110 actually reaches the retracted position.

This mutual contact takes place in a point (or zone) which is misaligned with respect to the hinging axis B, or through which an imaginary axis runs parallel to the sliding direction A but spaced and not intersecting the hinging axis B.

In this way, being the sliding of the second body 110 continued towards the retracted position (see FIG. 8), the pressure exerted by each thrust portion, in this case by each protrusion 240, against the corresponding abutment portion of the third body 115, in this case against the corresponding protruding element 250, gives rise to a moment of the force which tends to cause a mutual rotation of the first body 105 and of the third body 115 around the hinging axis B.

Since during this rotation each protrusion 240 rubs in contact on the edge of the respective protruding element 250, it is appropriate that the edge of each protruding element 250 be rounded as mentioned above, so as to improve the uniformity of the movement.

Although in the previous example a pair of protrusions 240 and a corresponding pair of protruding elements 250 have been described, it is not excluded that, in other embodiments, there may be only one protrusion 240 and only one corresponding protruding element 250 (possibly arranged otherwise and/or more centrally).

The support foot 100 can further comprise at least a first contrast spring 255, which is adapted to counteract the rotation of the first body 105 towards the inactive configuration, constantly pushing it towards the active configuration.

In the illustrated example, the first contrast spring 255 is a helical bending spring, which is partially wound around the hinging axis B, i.e. around the pin 200, and is operatively interposed between the flat surface 175 of the third body 115 and an external lateral surface of the first body 105.

Lastly, the support foot 100 can also comprise a second contrast spring 260, which is adapted to counteract any rotations of the first body 105 from the active configuration in the opposite direction with respect to the inactive configuration.

In practice, this second contrast spring 260 has the function of opposing the action of the first contrast spring 255, ensuring that the first body 105 can remain stably stationary in active configuration.

To carry out this function, the second contrast spring 260 can be a compression spring (e.g. helical) which is fixed to the buffer plate 145 or to the flat surface 175 of the third body 115, so as to be interposed between these two components when the first body 105 is in the active configuration.

With reference to FIGS. 13 to 18, the support foot 100 can be fixed to any structure S to be supported, for example to a trailer, a machine, a transport trolley or any other type of vehicle.

In particular, the third body 115 of the support foot 100 can be fixed to the structure S in such a way that the hinging axis B is substantially horizontal and that the first body 105, when it is in active configuration, is positioned below the third body 115 and the sliding direction A is oriented vertically.

Figure 13:
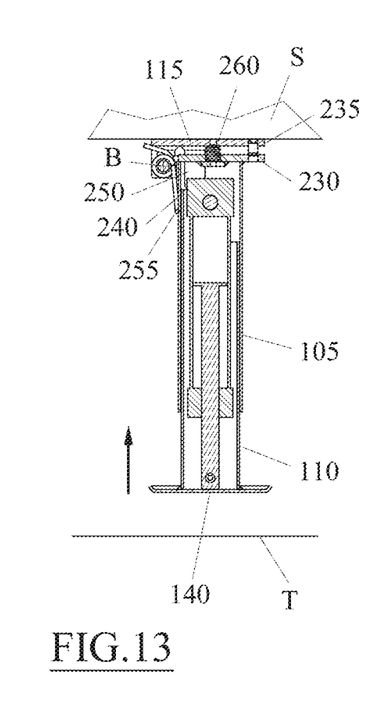
FIGS. 13 to 18 are the section of FIG. 6 shown in as many configurations during the operation of the support foot.
Figure 14:
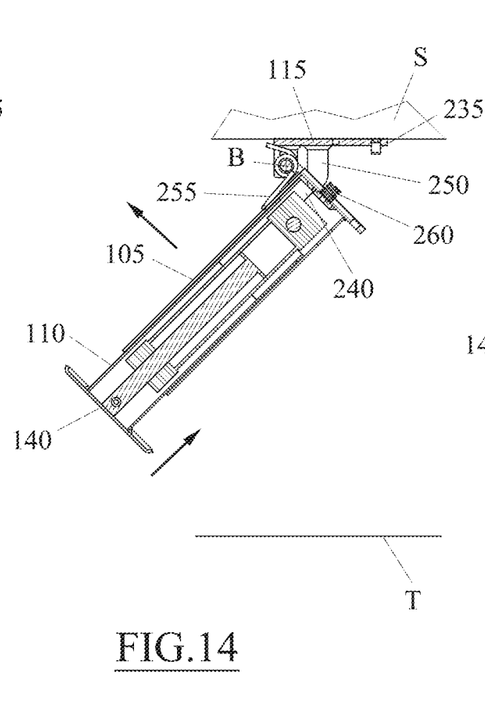
Figure 15:
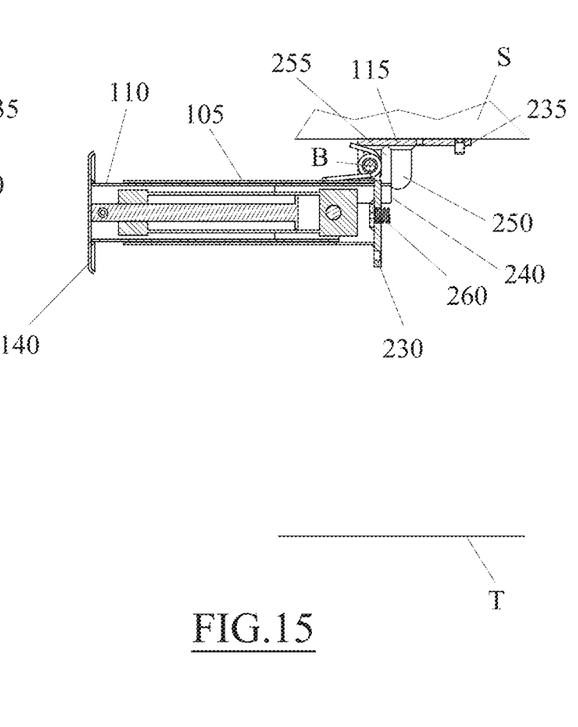

With the first body 105 in this active configuration, the operating cycle can be described starting from a condition in which the second body 110 is at least slightly raised from the ground (see FIG. 13).

In this condition, the first body 105 will also be in unlocked position, pushed by the force of gravity.

Starting from this condition, the actuator device 150 can be activated so as to actuate the second body 110 towards the retracted position (i.e. raising it further with respect to the ground).

After a given raising section, the thrust portions of the second body 110, in this case the protrusions 240, come into contact with the abutment portions of the third body 115, in this case with the protruding elements 250, after which (see FIG. 14) any further sliding of the second body 110 towards the retracted position will be accompanied by a corresponding rotation of the first body 105 (and consequently also of the second body 110) around the hinging axis B towards the inactive configuration (in contrast with the action of the contrast spring 255).

The achievement of the retracted position of the second body 110 (see FIG. 15) can coincide with the achievement of the inactive configuration of the first body 105 and, under this condition, the sliding direction A of the second body 110 can be substantially horizontal or almost.

In other words, the angular travel made by the first body 105 can be greater than 80° and approximately equal to 90°.

In this way, the first and second bodies 105 and 110 are reclined upwards, minimizing the vertical overall dimensions of the support foot 100.

Starting from this condition, the actuator device 150 can be activated so as to actuate the second body 110 in the opposite direction, again towards the advanced position.

In this way, the thrust portions of the second body 110, in this case the protrusions 240, tend to move away from the abutment portions of the third body 115, in this case from the corresponding protruding elements 250, so that the first body 105 tends to rotate again and progressively towards the active configuration, due to the effect of gravity and the thrust exerted by the first contrast spring 255.

In particular, the force of gravity would per se have the effect of bringing the first body 105 into an intermediate configuration in which the centre of mass of the group formed by the first body 105 and the second body 110 is vertically aligned with the hinging axis B.

Since the hinging axis B is spaced from the central axes C and C' in which this centre of mass lies, the aforesaid intermediate configuration would therefore generally correspond to an inclined orientation of the first body 105.

The action of the first contrast wheel 255 therefore has the function of pushing the first body 105 to further rotate from this intermediate configuration until it reaches the active configuration.

The action of the second contrast spring 260, on the other hand, has the function of preventing the first body 105 from rotating excessively, ensuring that it stops in the aforesaid active configuration.

Figure 16:
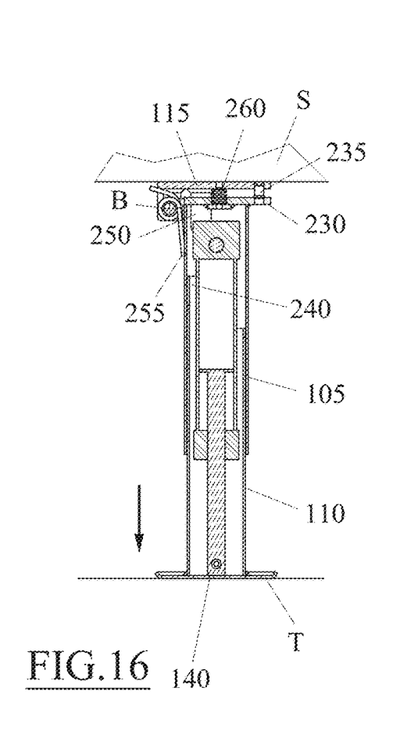

Once the first body 105 has reached the active configuration, the second body 110 can be made to slide further towards the advanced position, bringing it progressively in contact with the ground T (see FIG. 16).

Figure 17:
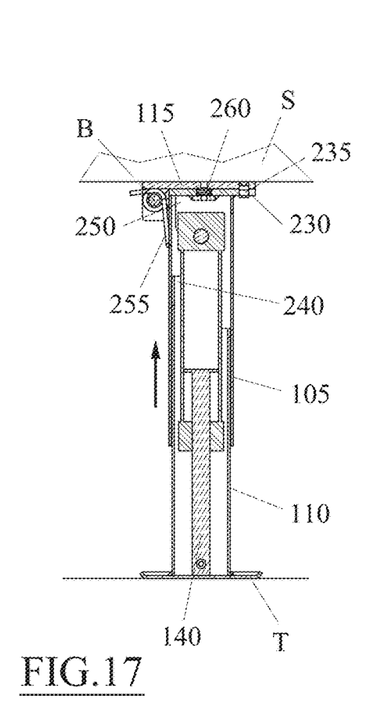

When the second body 110 is in contact with the ground T, a further sliding of the same towards the advanced position, will cause a displacement of the first body 105 with respect to the third body 115 along the sliding direction A, so as to bring it from the unlocked position to the locked position in which the first body 105 is unable to rotate (see FIG. 17).

Figure 18:
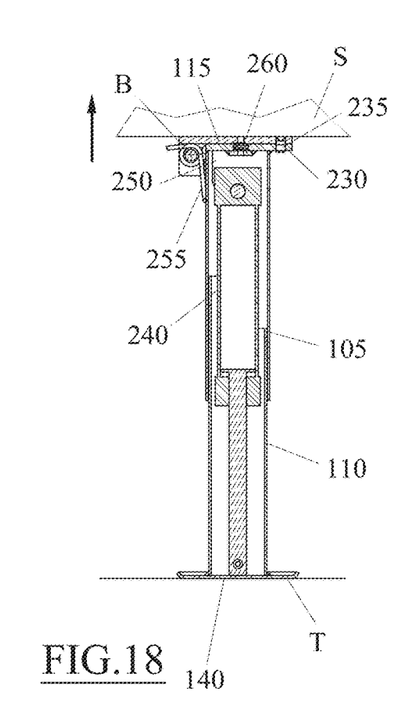

Subsequently, any further displacement of the second body 110 towards the advanced position will lead to a corresponding lifting of the third body 115, and therefore of the structure to be supported S (e.g. trailer, vehicle, etc.), with respect to the ground T (see FIG. 18).

Obviously, an expert in the field may make several technical-applicative modifications to all that above, without departing from the scope of the invention as hereinbelow claimed.

The invention claimed is:

1. A support foot comprising:
a first body,
a second body slidingly coupled to the first body along a pre-determined sliding direction,
an actuator device adapted to actuate the second body to slide with respect to the first body along said sliding direction between a retracted position and an advanced position,
a third body hinged to the first body according to a hinging axis orthogonal to the sliding direction of the second body, and
an actuation apparatus adapted to actuate the first body to rotate with respect to the third body around said hinging axis between an active configuration and an inactive configuration,
wherein said actuation apparatus comprises a mechanism adapted to transform a sliding of the second body from the advanced position towards the retracted position into a corresponding rotation of the first body from the active configuration to the inactive configuration.

2. The support foot according to claim 1, wherein said actuator device comprises at least one hydraulic jack.

3. The support foot according to claim 1, wherein said mechanism comprises at least a thrust portion of the second body which, at least in a terminal section of the displacement of the second body from the advanced position to the retracted position, is adapted to stay in contact with a corresponding abutment portion of the third body, in a point which is misaligned with respect to the hinging axis along the sliding direction.

4. The support foot according to claim 3, wherein the thrust portion of the second body is defined by the second axial end of the second body itself.

5. The support foot according to claim 4, wherein the abutment portion of the third body defined by at least a protruding element which, when the first body is in the active configuration, is fitted in-side the second axial end the first body itself.

6. The support foot according to claim 1, wherein said actuation apparatus comprises a contrast spring adapted to counteract the rotation of the first body from the active configuration to the inactive configuration.

7. The support foot according to claim 6, wherein said contrast spring is a helical bending spring at least partially wound around the hinging axis.

8. The support foot according to claim 6, further comprising a second contrast spring, which is adapted to counteract the rotation of the first body from the active configuration in the opposite direction with respect to the inactive configuration.

9. The support foot according claim 1, wherein the first body is hinged to the third body through a joint configured so that when the first body is in the active configuration, the joint allows a mutual displacement between the first body and the third body in a direction parallel to the sliding direction of the second body, between an unlocked position, in which the first body is free to rotate with respect to the third body around the hinging axis, and a locked position, in which the first body is unable to rotate with respect to the third body.

10. The support foot according to claim 9, further comprising a centering hole, obtained in one between the first body and the third body, which has a central axis spaced from the hinging axis and parallel to the sliding direction, at least when the first body is in active configuration, and a pin, stably fixed to the other between the first body and the third body, which is adapted to fit coaxially into the centering hole, following a displacement of the first body from the unlocked position to the locked position.

11. The support foot according to claim 1, wherein the first body has a tubular shape and is provided with a first axial end and an opposite second axial end,
wherein the second body has an elongated shape provided in turn with a first axial end and an opposite second axial end, and
wherein the second body is slidably fitted into the first body so that the first axial end of the second body protrudes from the first axial end of the first body at least when the second body is in an advanced position.

12. The support foot according to claim 11, wherein the third body is hinged to the first body near the second axial end of the first body itself.

13. The support foot according to claim 11, wherein the third body comprises a flat surface which, when the first body is in the active configuration, is facing the second axial end of the first body.

14. The support foot according to claim 13, further comprising a buffer plate which is fixed to the second axial end of the first body and is adapted to face the flat surface of the third body, when the first body is in the active configuration.

15. The support foot according to claim 14, wherein the second contrast spring is a compression spring fixed to the buffer plate or to the flat surface of the third body.

16. The support foot according to claim 1, wherein the third body is hinged to the first body through a joint which comprises at least one support provided with a cylindrical hole having axis coinciding with the hinging axis, and at least one pin having at least one engagement portion axially inserted inside said cylindrical hole, said support and said pin being fixed respectively to one and the other between the third body and the first body.

17. The support foot according to claim 16, wherein said support is further provided with a slot communicating with the cylindrical hole and extending with respect to the latter along a longitudinal direction which is parallel to the sliding direction of the second body, at least when the first body is in the active configuration,
wherein said slot has a width, in a direction orthogonal to said longitudinal direction and to the hinging axis (B), smaller than the diameter of the cylindrical hole,
wherein said engagement portion of the pin has a lateral surface provided with a cylindrical portion with a radius substantially equal to the radius of the cylindrical hole and at least one flattening,
wherein the size of the engagement portion along a direction orthogonal to said flattening and passing through the centre of the cylindrical portion is substantially equal to the width of the slot, and
wherein the pin and the support is mutually oriented so that, when the first body is in the active configuration, the engagement portion of the pin can slide inside the slot along the sliding direction.

\* \* \* \* \*